US011479228B2

(12) United States Patent
Sagayama et al.

(10) Patent No.: US 11,479,228 B2
(45) Date of Patent: Oct. 25, 2022

(54) BRAKE HYDRAULIC PRESSURE CONTROLLER AND MOTORCYCLE BRAKE SYSTEM

(71) Applicant: Robert Bosch GmbH, Stuttgart (DE)

(72) Inventors: Kosaku Sagayama, Kanagawa (JP); Takashi Ogawa, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 755 days.

(21) Appl. No.: 16/463,664

(22) PCT Filed: Oct. 25, 2017

(86) PCT No.: PCT/IB2017/056615
§ 371 (c)(1),
(2) Date: May 23, 2019

(87) PCT Pub. No.: WO2018/096415
PCT Pub. Date: May 31, 2018

(65) Prior Publication Data
US 2021/0114573 A1 Apr. 22, 2021

(30) Foreign Application Priority Data
Nov. 25, 2016 (JP) .............................. JP2016-228864

(51) Int. Cl.
*B60T 13/68* (2006.01)
*B60T 15/02* (2006.01)
(Continued)

(52) U.S. Cl.
CPC .......... *B60T 13/686* (2013.01); *B60T 15/028* (2013.01); *B62L 3/00* (2013.01); *F15B 13/026* (2013.01);
(Continued)

(58) Field of Classification Search
CPC ...................................................... B60T 8/3675
(Continued)

(56) References Cited

U.S. PATENT DOCUMENTS 5,462,344 A * 10/1995 Jakob ................. G05D 16/2026
137/884
5,513,905 A * 5/1996 Zeides ................ B60R 16/0239
303/119.3
(Continued)

FOREIGN PATENT DOCUMENTS

DE    112014003868    5/2016
EP         1746001    1/2007
(Continued)

OTHER PUBLICATIONS

International Search Report for Application No. PCT/IB2017/056615 dated Feb. 19, 2018 (English Translation, 3 pages).

*Primary Examiner* — Robert K Arundale
(74) *Attorney, Agent, or Firm* — Michael Best & Friedrich LLP

(57) ABSTRACT

The invention has a purpose of obtaining a brake hydraulic pressure controller capable of securing durability with a simple configuration and a motorcycle brake system. The brake hydraulic pressure controller is a hydraulic pressure controller for a vehicle brake system and includes: a base body that is formed with a channel filled with a brake fluid therein; a hydraulic pressure regulation valve that has a plunger and opens/closes the channel by translatory movement of said plunger; a drive coil that has a hollow section, is vertically provided in the base body in a state where one end of the plunger is inserted in said hollow section, and causes the translatory movement of the plunger to drive the hydraulic pressure regulation valve; and a coil casing that accommodates the drive coil. The coil casing includes a wall that covers at least a part of an apex of the vertically-
(Continued)

provided drive coil, and the drive coil is pressed toward the base body by a projection formed in the wall.

13 Claims, 5 Drawing Sheets

(51) Int. Cl.
*B62L 3/00* (2006.01)
*F15B 13/02* (2006.01)
*B62L 3/02* (2006.01)
*B62L 3/04* (2006.01)
*F15B 13/08* (2006.01)

(52) U.S. Cl.
CPC ............... *B62L 3/023* (2013.01); *B62L 3/04* (2013.01); *F15B 13/0814* (2013.01); *F15B 2211/40553* (2013.01)

(58) Field of Classification Search
USPC .................................. 303/119.3; 251/129.15
See application file for complete search history.

(56) References Cited

U.S. PATENT DOCUMENTS

| | | | | |
|---|---|---|---|---|
| 5,762,318 A * | 6/1998 | Staib | ................ | B60T 8/3675 303/119.2 |
| 5,820,228 A * | 10/1998 | Schneider | ............. | B60T 8/3675 303/DIG. 10 |
| 6,048,041 A * | 4/2000 | Mueller | .............. | F15B 13/0821 303/119.2 |
| 7,513,482 B2 * | 4/2009 | Shibata | ................... | B60T 8/363 303/119.2 |
| 8,235,350 B2 * | 8/2012 | Tetsuda | ................. | B60T 8/3685 248/560 |
| 9,267,610 B2 * | 2/2016 | Ogawa | .................... | B60T 8/368 |
| 2004/0113488 A1 * | 6/2004 | Sekihara | ................. | B60T 8/368 303/119.3 |
| 2004/0262559 A1 * | 12/2004 | Shibata | ................... | B60T 8/363 251/129.15 |
| 2007/0108401 A1 | 5/2007 | Shibata et al. | | |
| 2009/0000467 A1 * | 1/2009 | Kratzer | ............... | F15B 13/0853 91/459 |
| 2010/0219680 A1 * | 9/2010 | Dewart | ................. | B60T 8/3675 303/119.3 |
| 2013/0153799 A1 | 6/2013 | Ogawa et al. | | |
| 2018/0170333 A1 * | 6/2018 | Sagayama | ............. | B60T 8/3675 |

FOREIGN PATENT DOCUMENTS

| | | |
|---|---|---|
| JP | 2011150807 | 8/2011 |
| JP | 2013071491 | 4/2013 |

* cited by examiner

X-X

BRAKE HYDRAULIC PRESSURE CONTROLLER AND MOTORCYCLE BRAKE SYSTEM

BACKGROUND OF THE INVENTION

The invention relates to a brake hydraulic pressure controller and a motorcycle brake system that includes the brake hydraulic pressure controller.

Conventionally, a vehicular braking system for a motorcycle (a two-wheeled motor vehicle or a three-wheeled motor vehicle) or the like can generate a braking force on wheels when an occupant of a vehicle operates a brake lever, and a pressure of a brake fluid in a brake fluid circuit is increased. It has also been known to adopt an antilock brake system (ABS) unit, for example, as a brake hydraulic pressure controller that regulates the braking force.

This brake hydraulic pressure controller can regulate the braking force generated on the wheels by increasing or lowering the pressure of the brake fluid in the brake fluid circuit.

As the brake hydraulic pressure controller, a controller in which a pump device that changes a pressure of an actuation fluid in the brake fluid circuit, a hydraulic pressure regulation valve used to increase or lower the pressure of the actuation fluid, a controller that controls the pump device and the hydraulic pressure regulation valve, and the like are unitized has been available (for example, see JP-A-2011-150807).

SUMMARY OF THE INVENTION

In the conventional brake hydraulic pressure controller, a silicon ball is provided in a coil casing to absorb and alleviate vibrations generated due to driving of the hydraulic pressure regulation valve and the like, and durability thereof is thereby secured. However, a process of installing the silicon ball is required, and a space for a jig used to install the silicon ball is also required.

The invention has been made with a problem as described above as the background and therefore has a purpose of obtaining a brake hydraulic pressure controller capable of securing durability by a simple configuration and a motorcycle brake system including such a brake hydraulic pressure controller.

A brake hydraulic pressure controller according to the invention is a hydraulic pressure controller for a vehicle brake system and includes: a base body that is formed with a channel filled with a brake fluid therein; a hydraulic pressure regulation valve that has a plunger and opens/closes the channel by translatory movement of said plunger; a drive coil that has a hollow section, is vertically provided in the base body in a state where one end of the plunger is inserted in said hollow section, and causes the translatory movement of the plunger to drive the hydraulic pressure regulation valve; and a coil casing that accommodates the drive coil. The coil casing includes a wall that at least covers a part of an apex of the vertically-provided drive coil, and the drive coil is pressed toward the base body by a projection formed in the wall.

A motorcycle brake system according to the invention includes the above-described brake hydraulic pressure controller.

According to the brake hydraulic pressure controller of the invention, the drive coil is elastically supported by forming the projection in the wall of the coil casing. Thus, durability can be secured with a simple configuration by absorbing and alleviating vibrations that are generated due to driving of the hydraulic pressure regulation valve and the like.

According to the motorcycle brake system of the invention, because the durability can be secured with the simple configuration by the above brake hydraulic pressure controller, a high demand for downsizing of the motorcycle brake system can be handled.

DETAILED DESCRIPTION

Figure 1:
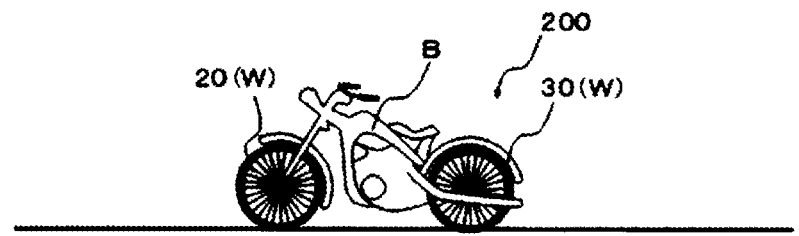
FIG. 1 is a schematic view of one example of a configuration of a motorcycle, on which a motorcycle brake system according to an embodiment is mounted.

A description will hereinafter be made on an embodiment of the invention with appropriate reference to the drawings.

Note that a description will hereinafter be made on a case where a brake hydraulic pressure controller according to the invention is used for a motorcycle; however, the brake hydraulic pressure controller according to the invention may be used for a vehicle other than the motorcycle (for example, an automobile, a truck, or the like). In addition, a description will hereinafter be made on a case where the brake hydraulic pressure controller according to the invention is applied to a brake system that includes a front-wheel hydraulic circuit and a rear-wheel hydraulic circuit; however, the brake hydraulic pressure controller according to the invention may be applied to a brake system that only includes one of the front-wheel hydraulic circuit and the rear-wheel hydraulic circuit.

A configuration, an operation, and the like, which will be described below, constitute merely one example, and the brake hydraulic pressure controller according to the invention is not limited to a case with such a configuration, such an operation, and the like. For example, the brake hydraulic pressure controller according to the invention may perform an operation other than that as an ABS.

There is a case where a dimensional relationship of components in each of the drawings differs from the actual dimensional relationship. In the drawings, the same members or portions or members or portions in a corresponding relationship will be denoted by the same reference sign or will not be denoted by the reference sign. In addition, in each of the drawings, detailed portions will appropriately be simplified or will not be depicted.

<External Appearance Configuration of Motorcycle 200>

A description will be made on a configuration of a motorcycle 200 by using FIG. 1. Note that, in the following description, a motorcycle brake system according to the embodiment will be referred to as a brake system 100.

FIG. 1 is a schematic view of one example of a configuration of the motorcycle, on which the motorcycle brake system according to the embodiment is mounted.

In the motorcycle 200, wheels W, a body B, and the brake system 100 are combined. The body B includes all components of the motorcycle 200 other than the brake system 100 and the wheels W. Note that, in this embodiment, a description will be made that the motorcycle 200 is a two-wheeled motor vehicle; however, the motorcycle 200 is not limited thereto and may be a three-wheeled motor vehicle.

<Overall Configuration of Brake System 100>

A description will be made on an overall configuration of the brake system 100 by using FIG. 2.

Figure 2:
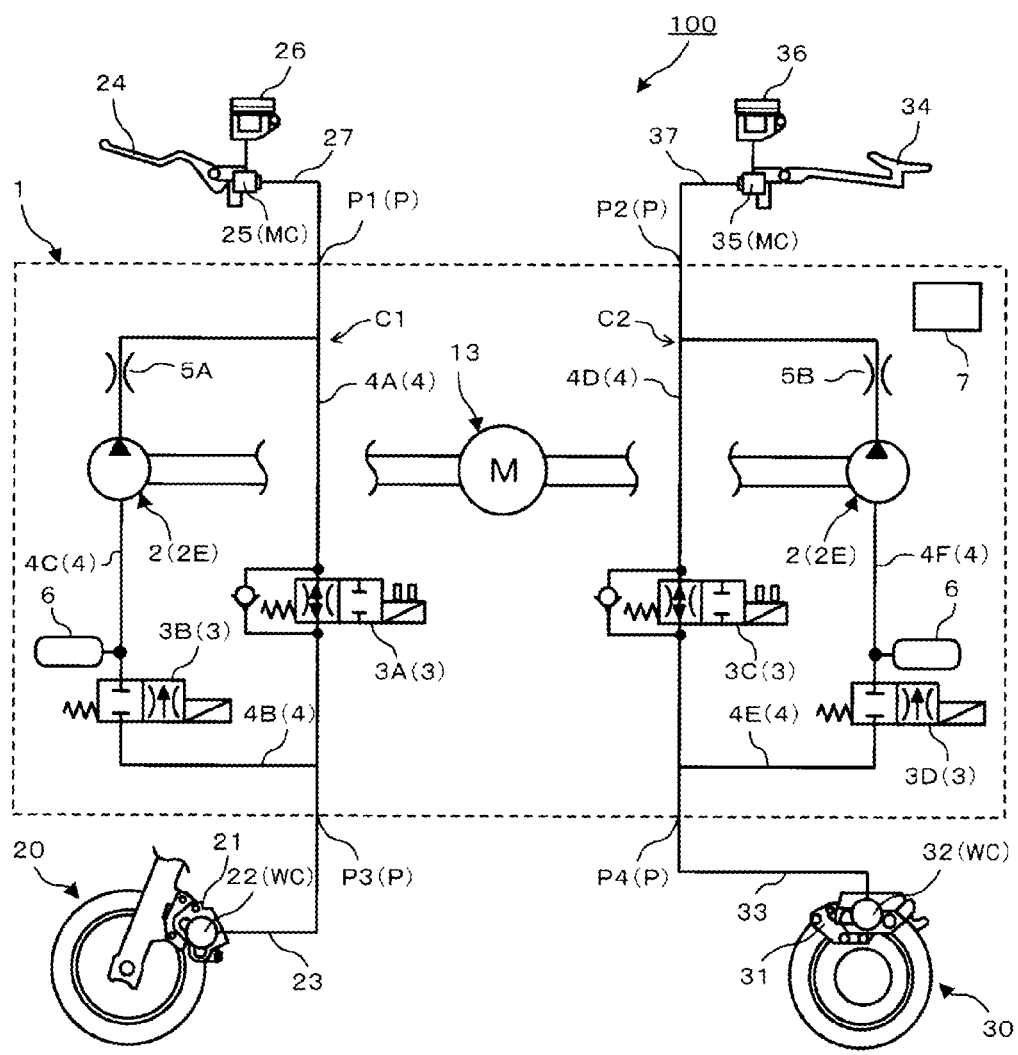
FIG. 2 is a schematic configuration diagram of the motorcycle brake system that includes a brake hydraulic pressure controller according to the embodiment.

FIG. 2 is a schematic configuration diagram of the motorcycle brake system that includes the brake hydraulic pressure controller according to the embodiment.

The brake system 100 includes a brake hydraulic pressure controller 1 that changes a braking force generated on the wheels W of the motorcycle 200.

The brake system 100 also includes a handlebar lever 24 and a foot pedal 34 that are operated by a user who drives the two-wheeled motor vehicle, or the like. When this handlebar lever 24 is operated, the braking force is generated on a front wheel 20. When the foot pedal 34 is operated, the braking force is generated on a rear wheel 30.

The brake system 100 includes: a front-wheel hydraulic circuit C1 through which a brake fluid used to generate the braking force on the front wheel 20 flows; and a rear-wheel hydraulic circuit C2 through which a brake fluid used to generate the braking force on the rear wheel 30 flows.

The brake system 100 includes the following configuration as a mechanism that generates the braking force on the front wheel 20, and the like. More specifically, the brake system 100 includes: a front brake pad 21 that is provided in a manner to correspond to the front wheel 20; a front wheel cylinder 22 in which a front brake piston (not depicted) actuating the front brake pad 21 is slidably provided; and a brake fluid pipe 23 that is connected to the front wheel cylinder 22.

Note that the front brake pad 21 is provided in a manner to hold a rotor (not depicted) that rotates with the front wheel 20 therebetween. The front brake pad 21, when being pressed by the front brake piston in the front wheel cylinder 22, abuts against the rotor and generates a friction force. In this way, the braking force is generated on the front wheel 20 that rotates with the rotor.

The brake system 100 includes: a first master cylinder 25 that is attached to the handlebar lever 24; a first reservoir 26 that stores the brake fluid; and a brake fluid pipe 27 that is connected to the first master cylinder 25. Note that a master cylinder piston (not depicted) is slidably provided in the first master cylinder 25. When the handlebar lever 24 is operated, the master cylinder piston in the first master cylinder 25 moves. Because a pressure of the brake fluid that is applied to the front brake piston is changed by a position of the master cylinder piston, a force of the front brake pad 21 to hold the rotor is changed. As a result, the braking force on the front wheel 20 is changed.

The brake system 100 includes the following configuration as a mechanism that generates the braking force on the rear wheel 30, and the like. More specifically, the brake system 100 includes: a rear brake pad 31 that is provided in a manner to correspond to the rear wheel 30; a rear wheel cylinder 32 in which a rear brake piston (not depicted) moving the rear brake pad 31 is slidably provided; and a brake fluid pipe 33 that is connected to the rear wheel cylinder 32.

Note that the rear brake pad 31 is provided in a manner to hold a rotor (not depicted) that rotates with the rear wheel 30 therebetween. The rear brake pad 31, when being pressed by the rear brake piston in the rear wheel cylinder 32, abuts against the rotor and generates a friction force. In this way, the braking force is generated on the rear wheel 30 that rotates with the rotor.

The brake system 100 includes: a second master cylinder 35 that is attached to the foot pedal 34; a second reservoir 36 that stores the brake fluid; and a brake fluid pipe 37 that is connected to the second master cylinder 35. Note that a master cylinder piston (not depicted) is slidably provided in the second master cylinder 35. When the foot pedal 34 is operated, the master cylinder piston in the second master cylinder 35 moves. Because a pressure of the brake fluid that is applied to the rear brake piston is changed by a position of the master cylinder piston, a force of the rear brake pad 31 to hold the rotor is changed. As a result, the braking force on the rear wheel 30 is changed.

<Configuration of Brake Hydraulic Pressure Controller 1>

A description will be made on a configuration of the brake hydraulic pressure controller 1 by using FIGS. 2 to 5.

Figure 3:
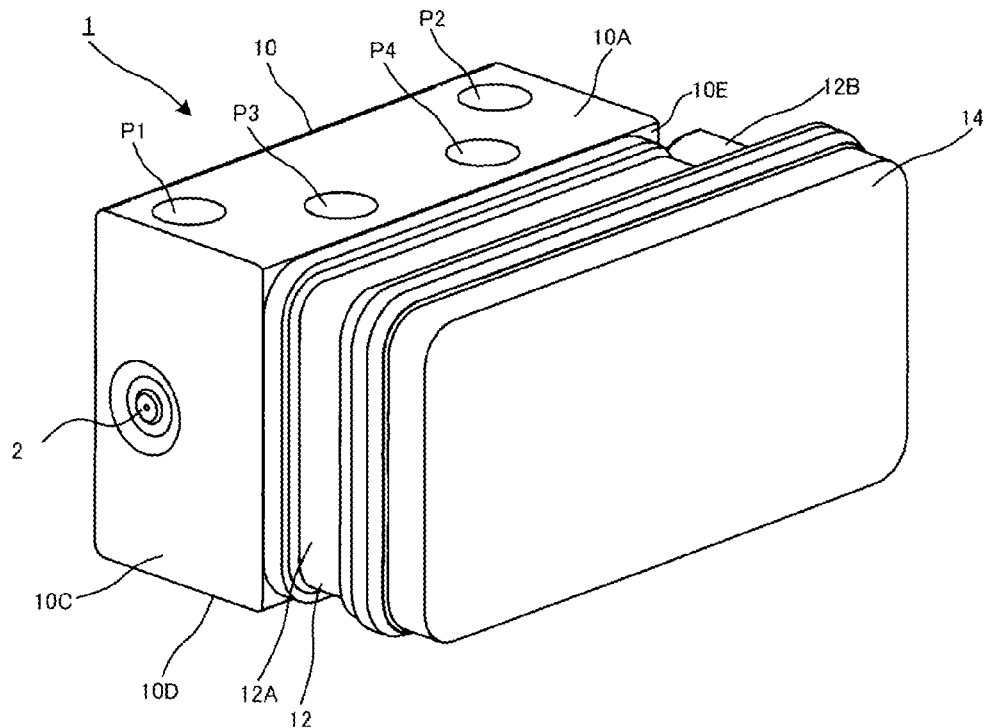
FIG. 3 is a perspective view of the brake hydraulic pressure controller according to the embodiment.

FIG. 3 is a perspective view of the brake hydraulic pressure controller according to the embodiment.

Figure 4:
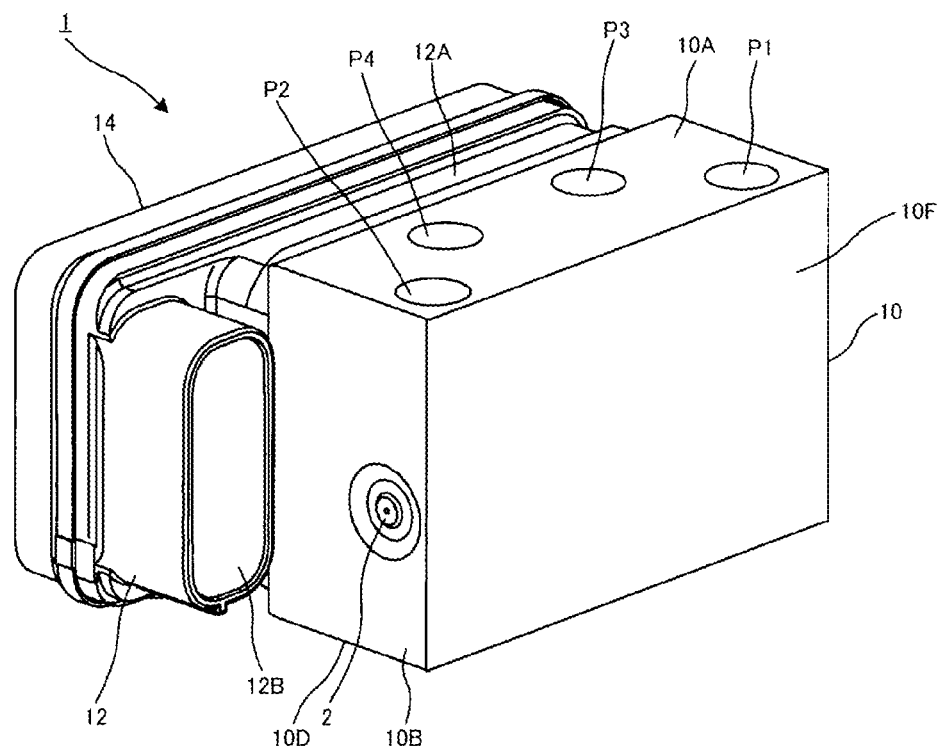
FIG. 4 is a perspective view of the brake hydraulic pressure controller according to the embodiment that is seen at a different angle from FIG. 3.

FIG. 4 is a perspective view of the brake hydraulic pressure controller according to the embodiment that is seen at a different angle from FIG. 3.

Figure 5:
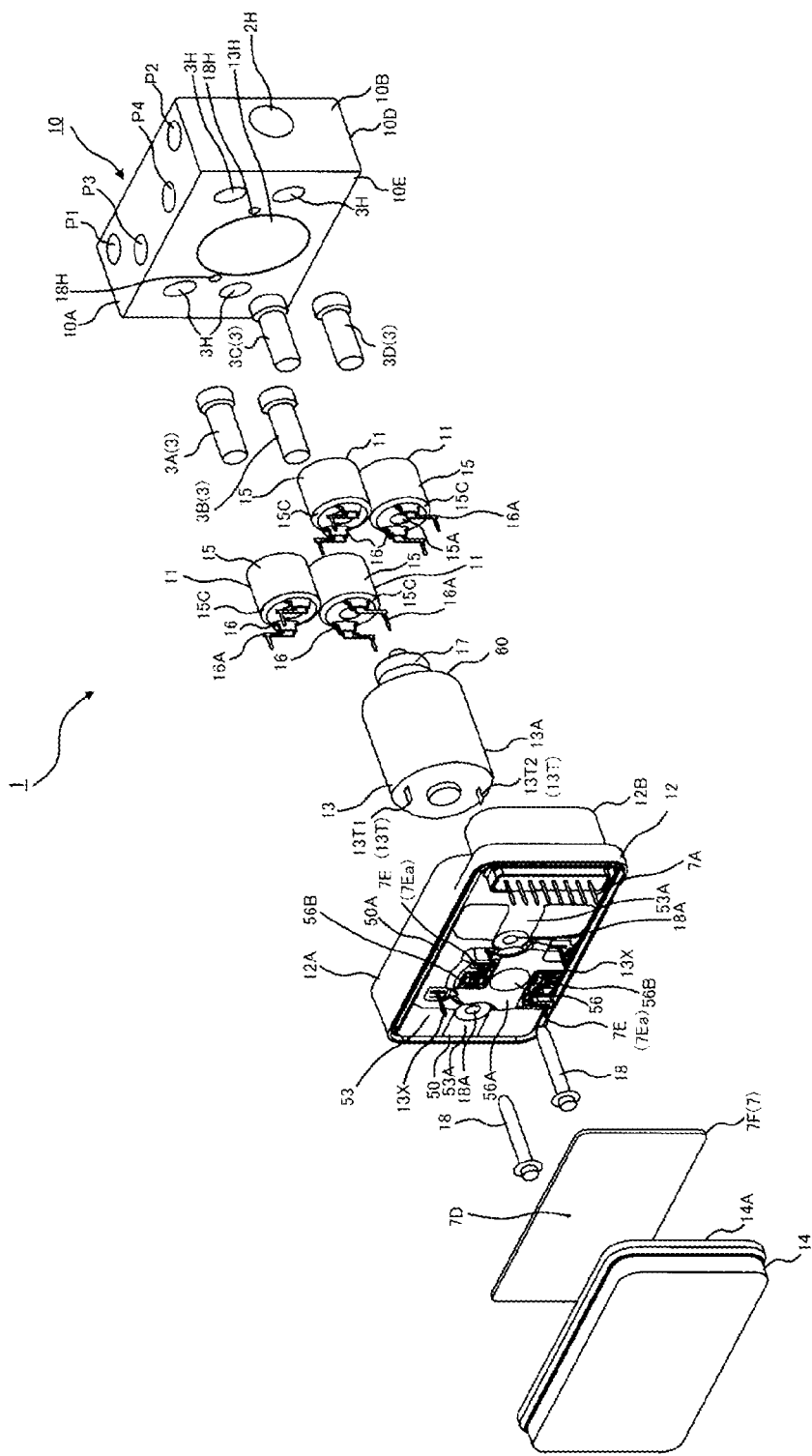
FIG. 5 is an exploded perspective view of the brake hydraulic pressure controller according to the embodiment.

FIG. 5 is an exploded perspective view of the brake hydraulic pressure controller according to the embodiment.

The brake hydraulic pressure controller 1 is configured by including: a base body 10 that is formed with an internal channel 4 (see FIG. 2) through which an actuation fluid flows; a pump device 2 that is assembled to the base body 10; hydraulic pressure regulation valves 3 that are freely openable/closable and are provided in the front-wheel hydraulic circuit C1 and the rear-wheel hydraulic circuit C2; drive coils 11 that respectively drive the hydraulic pressure regulation valves 3; a coil casing 12 that accommodates the drive coils 11; a motor 13 as a drive source of the pump device 2; a control unit 7 that includes a control section controlling operations of the pump device 2 and the hydraulic pressure regulation valves 3; a controller casing 14 that accommodates a circuit board 7F of the control unit 7; and the like.

As depicted in FIG. 3 and FIG. 4, exterior appearance of the brake hydraulic pressure controller 1 is configured that the base body 10, the coil casing 12, and the controller casing 14 are combined.

Next, a description will be made on a configuration of each component of the brake hydraulic pressure controller 1 with reference to FIG. 2 to FIG. 5.

(Base Body 10)

The base body 10 is made of metal such as aluminum and is formed of a substantially rectangular parallelepiped block. The base body 10 has a first surface 10A, a second surface 10B, a third surface 10C, a fourth surface 10D, a fifth surface 10E, and a sixth surface 10F.

The first surface 10A is a surface that is located on an upper side of the sheet in FIG. 3 and FIG. 4. The second surface 10B is a surface that is located on a left side of the sheet in FIG. 4. The third surface 10C is a surface that is located on the left side of the sheet in FIG. 3. The fourth surface 10D is a surface that is located on a lower side of the sheet in FIG. 3 and FIG. 4. The fifth surface 10E is a surface to which the coil casing 12 is attached in FIG. 3. The sixth surface 10F is a surface that is located on the right side of the sheet in FIG. 4.

In other words, the first surface 10A opposes the fourth surface 10D, the second surface 10B opposes the third surface 10C, and the fifth surface 10E opposes the sixth surface 10F.

The internal channel 4 that is filled with the brake fluid is formed in the base body 10.

The internal channel 4 is configured by including: a first internal channel 4A, a second internal channel 4B, and a third internal channel 4C, each of which constitutes a part of the front-wheel hydraulic circuit C1; and a fourth internal channel 4D, a fifth internal channel 4E, and a sixth internal channel 4F, each of which constitutes a part of the rear-wheel hydraulic circuit C2.

Various ports P are opened in the first surface 10A of the base body 10. The various ports P are configured by including: a first port P1 that corresponds to a drive mechanism including the handlebar lever 24 and the like; a second port P2 that corresponds to a drive mechanism including the foot pedal 34 and the like; a third port P3 that corresponds to a drive mechanism including the front brake pad 21 and the like; and a fourth port P4 that corresponds to a drive mechanism including the rear brake pad 31 and the like. The brake fluid pipe 27 is connected to the first port P1. The brake fluid pipe 37 is connected to the second port P2. The brake fluid pipe 23 is connected to the third port P3. The brake fluid pipe 33 is connected to the fourth port P4.

Of the internal channel 4, the first internal channel 4A is connected to an outflow side of the brake fluid in the pump device 2, a first booster valve 3A as one of the hydraulic pressure regulation valves 3, and the first port P1. In addition, the first internal channel 4A is provided with a first flow restrictor 5A that regulates a flow rate of the brake fluid flowing through the internal channel 4.

Of the internal channel 4, the second internal channel 4B is connected to the first booster valve 3A, a first reduction valve 3B as one of the hydraulic pressure regulation valves 3, and the third port P3.

Of the internal channel 4, the third internal channel 4C is connected to an inflow side of the brake fluid in the pump device 2 and the first reduction valve 3B. In addition, the third internal channel 4C is provided with an accumulator 6 that stores the brake fluid in the internal channel 4.

Of the internal channel 4, the fourth internal channel 4D is connected to the outflow side of the brake fluid in the pump device 2, a second booster valve 3C as one of the hydraulic pressure regulation valves 3, and the second port P2. In addition, the fourth internal channel 4D is provided with a second flow restrictor 5B that regulates the flow rate of the brake fluid flowing through the internal channel 4.

Of the internal channel 4, the fifth internal channel 4E is connected to the second booster valve 3C, a second reduction valve 3D as one of the hydraulic pressure regulation valves 3, and the fourth port P4.

Of the internal channel 4, the sixth internal channel 4F is connected to the inflow side of the brake fluid in the pump device 2 and the second reduction valve 3D. In addition, the sixth internal channel 4F is provided with an accumulator 6 that stores the brake fluid in the internal channel 4.

(Pump Device 2)

The pump device 2 includes two pump elements 2E that receive drive power from the motor 13 such as a DC motor. One of the pump elements 2E is used to deliver the brake fluid in the front-wheel hydraulic circuit C1 and delivers the brake fluid in the third internal channel 4C to the first internal channel 4A side. The other of the pump elements 2E is used to deliver the brake fluid in the rear-wheel hydraulic circuit C2 and delivers the brake fluid in the sixth internal channel 4F to the fourth internal channel 4D side. The pump element 2E reciprocates by rotary movement of an eccentric surface of an eccentric mechanism 17 that is driven by the motor 13. The pump elements 2E are respectively accommodated in pump openings 2H that are formed in the base body 10.

(Motor 13)

The motor 13 includes a motor section 13A that includes a casing, a stator, a rotor, and the like. The motor 13 is provided on the coil casing 12 side of the base body 10. An operation of the motor section 13A is controlled by the control unit 7. Two motor terminals 13T in shapes of thin pieces are vertically provided at an end of the motor section 13A on the coil casing 12 side. One of the motor terminals 13T is a positive terminal 13T1, and the other of the motor terminals 13T is a negative terminal 13T2.

(Eccentric Mechanism 17)

The eccentric mechanism 17 drives the pump device 2 by using rotary power that is transmitted from the motor 13. That is, the eccentric mechanism 17 transmits the rotary power, which is transmitted from the motor section 13A of the motor 13, to the pump device 2.

(Deceleration Mechanism 60)

A deceleration mechanism 60 is provided between the motor 13 and the eccentric mechanism 17, decelerates rotation generated in the motor section 13A of the motor 13, that is, amplifies torque, and transmits the torque to the eccentric mechanism 17. The deceleration mechanism 60 is attached to a rotary shaft of the motor 13 and is accommodated with a part of the motor 13 in a motor opening 13H that is formed in the base body 10.

(Hydraulic Pressure Regulation Valve 3 and Drive Coil 11)

Each of the hydraulic pressure regulation valves 3 is a valve that is provided to open/close the internal channel 4 of the base body 10. An operation of each of the hydraulic pressure regulation valves 3 is controlled by the control unit 7. The hydraulic pressure regulation valves 3 include the first booster valve 3A, the first reduction valve 3B, the second booster valve 3C, and the second reduction valve 3D. Each of the hydraulic pressure regulation valves 3 can be configured as an electromagnetic valve that has the drive coil 11, for example, and an opened/closed state thereof is switched when energization thereof is controlled by the control unit 7. More specifically, the hydraulic pressure regulation valve 3 has a movable element including a plunger, and the internal channel 4 is opened/closed when the plunger of the movable element performs translatory movement by the drive coil 11.

In the drive coil 11, winding is accommodated in a cylindrical coil housing 15. One end side of the hydraulic pressure regulation valve 3 is accommodated in a columnar opening 15A that penetrates the coil housing 15. The other end side of the hydraulic pressure regulation valve 3 is accommodated in a regulation valve opening 3H that is formed in the fifth surface 10E of the base body 10. A base section of the drive coil 11 is adhered to the base body 10. That is, the drive coil 11 has a hollow section and is vertically provided in the base body 10 in a state where one end of the plunger of the hydraulic pressure regulation valve 3 is inserted in this hollow section. When the energization of the drive coil 11 is turned on/off in this state, the plunger of the hydraulic pressure regulation valve 3 performs the translatory movement, and a valve body that interlocks with the plunger moves between a closed position and an open position.

A pair of terminal boards 16 is vertically provided at the other end 15C that opposes the one end of the coil housing 15, the one end being fixed to the fifth surface 10E of the base body 10. A coil terminal 16A is provided at a tip of each of the terminal boards 16, and power is supplied to the drive coil 11 via the coil terminal 16A.

(Accumulator 6)

The accumulator 6 is arranged in an accumulator opening (not depicted) that is formed in the base body 10.

(Control Unit 7)

The control unit 7 includes the circuit board 7F that is provided with an input section receiving signals from detection mechanisms, a processor section performing arithmetic processing, a memory section storing a program, and the like. The coil terminals 16A of the drive coils 11 and the motor terminals 13T of the motor 13 are connected to the circuit board 7F. That is, the circuit board 7F is formed with plural openings 7D, through each of which one end 7Ea of a metal piece 7E connected to the motor terminal 13T is inserted. In addition, the circuit board 7F is formed with plural openings (not depicted), through which the coil terminals 16A and pins 13X are respectively inserted.

Note that the control unit 7 includes various types of the detection mechanisms, each of which outputs the detection signal to the circuit board 7F. As the detection mechanisms, for example, an acceleration sensor used to obtain a gradient value of a road surface, a front-wheel speed sensor used to compute a wheel speed of the front wheel 20, a rear-wheel speed sensor used to compute a wheel speed of the rear wheel 30, and the like are provided.

In a state where the one end 7Ea of the metal piece 7E is inserted through the opening 7D, the circuit board 7F is brought into a parallel state with a first surface 50 of the coil casing 12. In this state, the circuit board 7F is accommodated in the controller casing 14. That is, when the one end 7Ea of the metal piece 7E is inserted through the opening 7D, the circuit board 7F of the control unit 7 is positioned and is attached in parallel with the first surface 50.

(Coil Casing 12)

The coil casing 12 is molded by a resin, for example and is configured by including: a frame section 12A; and an accommodating section 12B that is formed on a side of the frame section 12A and accommodates a connector 7A connected to the control unit 7. The coil casing 12 is adhered to the fifth surface 10E of the base body 10 via an adhesive member, for example. This adhesive member is preferably a seal member having waterproof performance.

The frame section 12A is formed with an opening 53 and a motor hole 56. When each of the drive coils 11 is accommodated in the coil casing 12, the coil terminal 16A is projected from the first surface 50 of the coil casing 12, and the circuit board 7F can thereby be connected thereto. When the motor 13 is accommodated in the motor hole 56, each of the motor terminals 13T penetrates a terminal opening 56B that is formed at a bottom 56A of the motor hole 56, is projected from the first surface 50 of the coil casing 12, and can thereby be connected to the other end of the metal piece 7E, the one end 7Ea of which is connected to the circuit board 7F.

A wall 53A is formed between the two openings 53. That is, the frame section 12A is configured by including the wall 53A that at least covers a part of an apex of each of the vertically-provided drive coils 11. The wall 53A is configured by including a double-supported beam, which is a beam that is supported at opposite ends. One end of the double-supported beam is located on a center side of the frame section 12A, and the other end thereof is located on an outer peripheral side of the frame section 12A.

The wall 53A is formed with screw fixing holes 18A, in each of which a screw 18 is inserted, as through-holes. The screws 18 are respectively joined to screw openings 18H that are formed in the base body 10, and the coil casing 12 is thereby fixed to the fifth surface 10E of the base body 10.

The first surface 50 includes an edge 50A that abuts against an opening edge 14A of the controller casing 14 at a time when the controller casing 14 is attached to the coil casing 12.

(Controller Casing 14)

The controller casing 14 is attached to the first surface 50 of the coil casing 12 and functions as a lid member that accommodates the circuit board 7F of the control unit 7 therein.

<Pressing Structure of Drive Coils 11 by Wall 53A>

A description will be made on a pressing structure of the drive coils 11 by the wall 53A by using FIG. 6 to FIG. 8.

Figure 6:
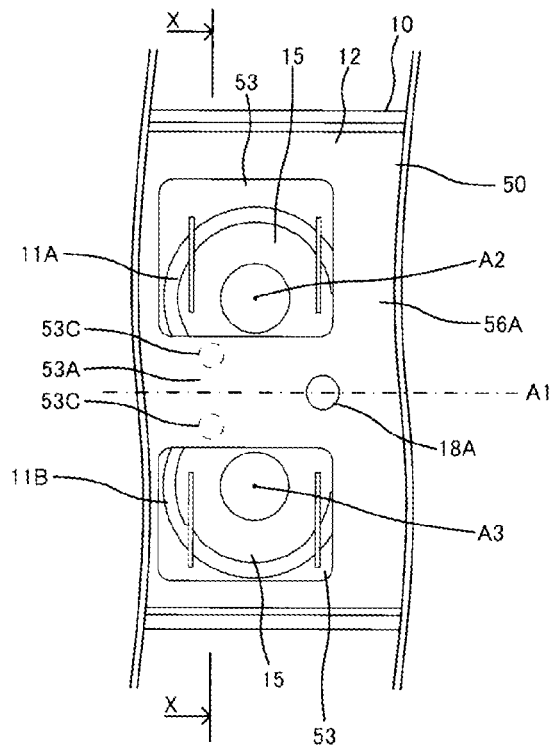
FIG. 6 is a schematic view of a state where drive coils are attached to a coil casing of the brake hydraulic pressure controller according to the embodiment and in which the state is seen from a first surface.

FIG. 6 is a schematic view of a state where the drive coils are attached to the coil casing of the brake hydraulic pressure controller according to the embodiment and in which the state is seen from the first surface.

Figure 7:
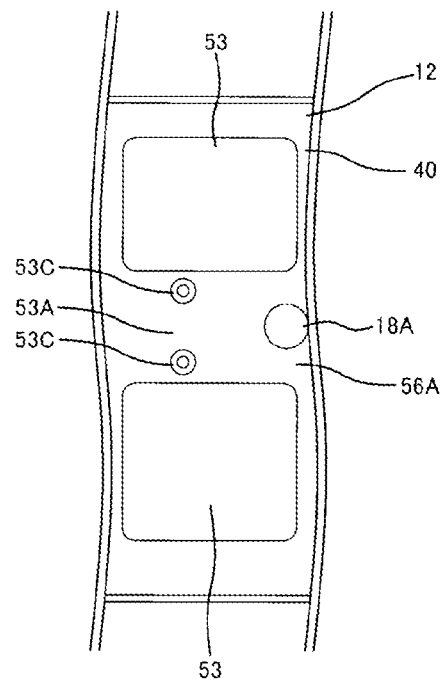
FIG. 7 is a schematic view of the coil casing of the brake hydraulic pressure controller according to the embodiment that is seen from an opposite side from the first surface.

FIG. 7 is a schematic view of the coil casing of the brake hydraulic pressure controller according to the embodiment that is seen from an opposite side from the first surface.

Figure 8:
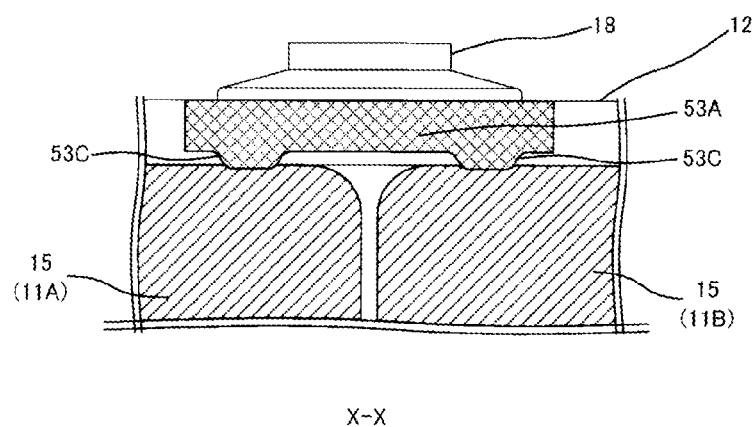
FIG. 8 is a cross-sectional view taken along X-X in FIG. 6.

FIG. 8 is a cross-sectional view taken along X-X in FIG. 6.

Note that a part of the coil casing 12 is depicted in an enlarged manner in FIG. 6 and FIG. 7.

As depicted in FIG. 6 to FIG. 8, projections 53C are formed in the wall 53A. Each of the projections 53C is formed by projecting a part of the wall 53A on a surface on an opposite side (hereinafter referred to as a second surface 40) from the first surface 50 of the coil casing 12. The coil casing 12 accommodates the plural drive coils 11, the double-sided beam of the wall 53A covers at least a part of an apex of a first drive coil 11A and at least a part of an apex of a second drive coil 11B, and covering portions thereof are respectively formed with a projection 53C that presses the first drive coil 11A and a projection 53C that presses the second drive coil 11B.

The double-sided beam of the wall 53A is configured to be perpendicular to a plane that includes a center axis A2 of the first drive coil 11A and a center axis A3 of the second drive coil 11B and to extend along a straight line (a straight line A1 depicted in FIG. 6) that passes through centers of the first drive coil 11A and the second drive coil 11B. In addition, the projection 53C that presses the first drive coil 11A and the projection 53C that presses the second drive coil 11B are formed at symmetrical positions about the straight line A1.

The screw fixing hole 18A is formed at one end (an end on the motor hole 56 side) of the double-sided beam of the wall 53A, and the projections 53C are formed on a far side from the center axes (the center axis A2 and the center axis A3) of the drive coils 11 with the screw fixing hole 18A being a reference of the double-sided beam of the wall 53A.

The coil casing 12 that accommodates the drive coils 11 is adhered to the base body 10 and is further fixed by the screw 18. In such a state, the one end of the double-sided beam of the wall 53A is pressed toward the base body 10 by the screw 18, and the apexes (ends on the terminal board 16 side) of the drive coils 11 are pressed toward the base body 10 by the projections 53C formed in the wall 53A. In addition, the double-sided beam of the wall 53A is repelled toward the first surface 50 side by a projecting effect by the drive coils 11, and loosening of the screw 18 is thereby prevented.

<Effects>

According to the brake hydraulic pressure controller 1 of the embodiment, the drive coils 11 are pressed toward the base body 10 by the projections 53C formed in the wall 53A. Accordingly, even in a situation where vibrations are generated by driving of the drive coils 11 (particularly, the translatory movement of the plungers) and the like, fixation of the drive coils 11 to the base body 10 is supported by the projections 53C, and thus durability is secured.

According to the brake hydraulic pressure controller 1 of the embodiment, the base sections of the vertically-provided drive coils 11 are adhered to the base body 10. Because the projections 53C also function as holding members during adhesion of the drive coils 11, a jig and the like therefor become unnecessary, and thus manufacturing is simplified.

According to the brake hydraulic pressure controller 1 of the embodiment, the coil casing 12 is fixed to the base body 10 by the screw 18. Thus, the projections 53C also function to prevent loosening of the screw 18, and thus the durability is improved with a simple structure.

According to the brake hydraulic pressure controller 1 of the embodiment, the coil casing 12 is adhered to the base body 10. The projections 53C can prevent uplifting of the coil casing 12, which is caused by loosening of the screw 18, during the adhesion of the coil casing 12 to the base body 10, and thus a chance of adhesion failure of the coil casing 12 and the base body 10 is reduced with the simple structure.

According to the brake hydraulic pressure controller 1 of the embodiment, the wall 53A includes the double-sided beam, the one end of the double-sided beam is pressed toward the base body 10 by the screw 18, and the projections 53C are formed in the double-sided beam. Because the double-sided beam is included in the wall 53A, a spring property of the wall 53A is improved by the double-sided beam structure, and the prevention of loosening of the screw 18 can further be reinforced.

According to the brake hydraulic pressure controller 1 of the embodiment, the projections 53C are formed on the far side from the center axes (the center axis A2 and the center axis A3) of the drive coils 11 with the through hole (the screw fixing hole 18A) being the reference. By forming the projections 53C away from the screw 18, the prevention of loosening of the screw 18 can further be reinforced.

According to the brake hydraulic pressure controller 1 of the embodiment, the double-sided beam of the wall 53A covers at least the part of the apex of the first drive coil 11A and at least the part of the apex of the second drive coil 11B, and the covering portions thereof are respectively formed with the projection 53C that presses the first drive coil 11A and the projection 53C that presses the second drive coil 11B. Thus, by the projecting effects thereof from the two drive coils 11, the prevention of loosening of the screw 18 can further be reinforced.

According to the brake hydraulic pressure controller 1 of the embodiment, the double-sided beam of the wall 53A is perpendicular to the plane that includes the center axis A2 of the first drive coil 11A and the center axis A3 of the second drive coil 11B, and extends along the straight line A1 that passes through the centers of the first drive coil 11A and the second drive coil 11B. The projection 53C that presses the first drive coil 11A and the projection 53C that presses the second drive coil 11B are formed at the symmetrical positions about the straight line A1 that passes through the centers of the first drive coil 11A and the second drive coil 11B. Accordingly, the projecting effects thereof from the two drive coils 11 are equalized, and the prevention of loosening of the screw 18 is reliably secured.

According to the brake hydraulic pressure controller 1 of the embodiment, the coil casing 12 is made of the resin. Even in a situation where thermal deformation occurs to the coil casing 12, loosening of the screw 18 is prevented by the projections 53C.

The brake hydraulic pressure controller 1 according to the embodiment is mounted on the motorcycle brake system 100 of the motorcycle 200. Because the durability can be secured with the simple structure by the brake hydraulic pressure controller 1, a high demand for downsizing of the motorcycle brake system 100 can be handled.

REFERENCE SIGNS LIST

1: Brake hydraulic pressure controller
2: Pump device
3: Hydraulic pressure regulation valve
4: Internal channel
7: Control unit
10: Base body
11: Drive coil
12: Coil casing
12A: Frame
12B: Accommodating section
13: Motor
14: Controller casing
15: Coil housing
16A: Coil terminal
17: Eccentric mechanism
18: Screw
18A: Screw fixing hole
20: Front wheel
21: Front brake pad
22: Front wheel cylinder
23: Brake fluid pipe
24: Handlebar lever
25: First master cylinder
26: First reservoir
27: Brake fluid pipe
30: Rear wheel
31: Rear brake pad
32: Rear wheel cylinder
33: Brake fluid pipe
34: Foot pedal
35: Second master cylinder
36: Second reservoir
37: Brake fluid pipe
40: Second surface
50: First surface
53: Opening
53A: Wall
53C: Projection
56A: Bottom
56B: Terminal opening
60: Deceleration mechanism
100: Brake system
200: Motorcycle
C1: Front-wheel hydraulic circuit
C2: Rear-wheel hydraulic circuit

What is claimed is:

1. A hydraulic pressure controller for a vehicle brake system, the hydraulic pressure controller comprising:
   a base body that is formed with a channel filled with a brake fluid therein;
   a hydraulic pressure regulation valve that has a plunger and opens/closes the channel by translatory movement of said plunger;
   a drive coil that has a hollow section, is vertically provided in the base body in a state where one end of the plunger is inserted in said hollow section, and causes the translatory movement of the plunger to drive the hydraulic pressure regulation valve; and
   a coil casing that accommodates the drive coil, wherein
   the coil casing includes a wall that at least covers a part of an apex of the vertically-provided drive coil, and
   the drive coil is pressed toward the base body by a projection formed in the wall,
   wherein the wall includes a beam that is supported at opposite ends,
   wherein the beam is formed with a through hole in which a screw is inserted,
   wherein the coil casing is fixed to the base body by the screw,
   wherein the projection is formed in the beam, and
   wherein the beam is pressed toward the base body by the screw so that the projection presses the drive coil toward the base body.

2. The brake hydraulic pressure controller according to claim 1, wherein
   a base section of the vertically-provided drive coil is adhered to the base body.

3. The brake hydraulic pressure controller according to claim 1, wherein
   the coil casing is adhered to the base body.

4. The brake hydraulic pressure controller according to claim 1, wherein
   the drive coil is a first drive coil of plural drive coils,
   the coil casing accommodates the plural drive coils,
   the beam covers at least a part of an apex of the first drive coil and at least a part of an apex of a second drive coil of the plural drive coils,
   wherein the projection is a first projection, and
   the beam is formed with the first projection that presses the first drive coil toward the base body and a second projection that presses the second drive coil toward the base body.

5. The brake hydraulic pressure controller according to claim 4, wherein
   the first projection is formed on an opposite side of a plane from the through hole, wherein the plane includes (i) a center axis of the first drive coil and (ii) a center axis of the second drive coil.

6. The brake hydraulic pressure controller according to claim 5, wherein
   the second projection is also formed on an opposite side of the plane from the through hole,
   the beam is perpendicular to the plane and extends along a straight line perpendicular to the plane, the straight line being positioned equidistant from (i) the center axis of the first drive coil and (ii) the center axis of the second drive coil,
   the first projection and the second projection are formed at symmetrical positions about the straight line,
   the beam includes the through hole, and
   the line passes through the through hole.

7. The brake hydraulic pressure controller according to claim 4, wherein
   the beam is perpendicular to a plane that includes a center axis of the first drive coil and a center axis of the second drive coil, and extends along a straight line that passes through centers of the first drive coil and the second drive coil, and
   the first projection and the second projection are formed at symmetrical positions about the straight line.

8. The brake hydraulic pressure controller according to claim 4, wherein
   the screw extends between the first drive coil and the second drive coil.

9. The brake hydraulic pressure controller according to claim 8, wherein
   the beam contacts a top of the first drive coil and a top of the second drive coil.

10. The brake hydraulic pressure controller according to claim 1, wherein
    the coil casing is made of a resin.

11. A motorcycle brake system comprising:
    the brake hydraulic pressure controller according to claim 1.

12. The brake hydraulic pressure controller according to claim 1, wherein
    the screw includes a screw head, and wherein the screw head acts to press the projection formed in the wall against the drive coil.

13. The brake hydraulic pressure controller according to claim 1, wherein
    the beam extends between a first opening and a second opening in the wall, and wherein the through hole is located between the first opening and the second opening.

* * * * *